(12) United States Patent
Walker et al.

(10) Patent No.: US 7,571,945 B2
(45) Date of Patent: Aug. 11, 2009

(54) COLLAPSIBLE SHOVEL

(75) Inventors: Ben Walker, Draper, UT (US); David Narajowski, Park City, UT (US); Thomas Laakso, Park City, UT (US); David Mellon, Park City, UT (US); Chad John Whittaker, Springville, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 0 days.

(21) Appl. No.: 11/271,066

(22) Filed: Nov. 12, 2005

(65) Prior Publication Data

US 2007/0108782 A1    May 17, 2007

(51) Int. Cl.
*A01B 1/22* (2006.01)
*B25G 1/04* (2006.01)
(52) U.S. Cl. .................................... 294/51; 294/54.5
(58) Field of Classification Search .................. 294/51, 294/54.5, 57
See application file for complete search history.

(56) References Cited

U.S. PATENT DOCUMENTS

| | | | | | |
|---|---|---|---|---|---|
| 969,307 | A | * | 9/1910 | Sumerlin | 294/51 |
| 1,207,472 | A | * | 12/1916 | Barton | 294/54.5 |
| 2,047,485 | A | * | 7/1936 | McBrady | 294/57 |
| D267,468 | S | * | 1/1983 | Simms | D8/10 |
| D297,468 | S | * | 8/1988 | Young | D24/110.4 |
| D363,862 | S | * | 11/1995 | Lusignan | D8/10 |
| 5,533,768 | A | * | 7/1996 | Mitchell | 294/54.5 |
| 5,795,000 | A | * | 8/1998 | Aldorasi | 294/57 |
| 6,003,915 | A | * | 12/1999 | Bierman | 294/51 |
| 6,213,672 | B1 | * | 4/2001 | Varga | 403/109.2 |
| 6,412,843 | B1 | * | 7/2002 | Burbrink et al. | 294/57 |

* cited by examiner

*Primary Examiner*—Paul T Chin
(74) *Attorney, Agent, or Firm*—Trent H. Baker; Baker & Associates PLLC

(57) ABSTRACT

A portable snow shovel that includes a unique collapsible mechanism. One embodiment of the shovel includes both an expanded and collapsed state. The shovel includes a blade member and an elongated shaft member. The elongated shaft member is slidably engaged to the blade member through a recess that extends through the blade member. The elongated shaft member is able to translate with respect to the blade member between the extended and collapsed states. The collapsed state relates to a configuration in which the elongated shaft member is extended through the recess and over the blade member a particular amount. The extended state relates to a configuration in which the elongated shaft member is extended through the recess and away from the blade member a particular amount.

14 Claims, 3 Drawing Sheets

COLLAPSIBLE SHOVEL

FIELD OF THE INVENTION

The invention generally relates to shovels. In particular, the invention relates to collapsible shovels which include a collapsed state and an extended state.

BACKGROUND OF THE INVENTION

Shovels are used for displacing materials from one location to another. A shovel has the ability to quickly displace material without requiring the user to touch the material. A quantity of material is generally scooped up by a shovel and then released in a different location. Shovels can be used to displace a wide variety of materials including dirt, snow, etc.

Shovels include two primary components, a blade and a shaft. The blade is the shovel component in which the material is gathered. Blades are often concave or rounded to facilitate retaining loose materials. The shaft is an elongated member which extends away from the blade a particular amount. The shaft provides an interface for a user and can be used to create a lever force when scooping up material. The shaft is also used to support the materials during transportation. The shaft may also include a handle region for a user's hand.

One particular type of shovel is a portable snow shovel. Skiers, snowboarders, snowshoers and other snow sport enthusiasts often carry portable snow shovels for a variety of purposes. One application for a portable snow shovel is for quickly removing snow from a buried person after an avalanche. Other applications include digging a snow pit, digging a shelter, building a snow structure, excavating a vehicle, etc. Portable snow shovels are designed to be low profile and light weight such that they can be carried during athletic activities or easily stored in small places.

A particularly useful feature of many portable snow shovels is the ability to collapse into a low profile configuration. This type of shovel includes both an expanded state for operation and a collapsed state for storage. In order to be low profile, various collapsing systems are utilized in conventional portable snow shovels. Most modern portable snow shovels utilize a disengagement system that allows the shaft to be disengaged from the blade. The shaft and blade can then be stored on top of one another as to minimize its dimension. Disengagement systems are undesirable because of the extra time necessary to reassemble the shaft and blade. In addition, the narrow shaft can easily slide out of a user's pack causing the shovel to become useless. Some portable snow shovels include a hinge or mechanism that allows the shaft to fold over the blade. These folding shovels must include a locking mechanism when folded into the expanded configuration to prevent undesirable folding. In addition, the hinge mechanism on a folding shovel is easily iced over during use, thereby preventing future folding.

Therefore, there is a need in the industry for a portable snow shovel that overcomes the disadvantages of the prior art.

SUMMARY

The present invention relates to a portable snow shovel that includes a unique collapsible mechanism. One embodiment of the present invention relates to a shovel that includes both an expanded and collapsed state. The shovel includes a blade member and an elongated shaft member. The elongated shaft member is slidably engaged to the blade member through a recess that extends through the blade member. The elongated shaft member is able to translate with respect to the blade member between the extended and collapsed states. The collapsed state relates to a configuration in which the elongated shaft member is extended through the recess and over the blade member a particular amount. The extended state relates to a configuration in which the elongated shaft member is extended through the recess and away from the blade member a particular amount. An optional locking mechanism may be utilized to releasably lock the elongated shaft member with respect to the blade member in the two states.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention relates to a portable snow shovel that includes a unique collapsible mechanism. One embodiment of the present invention relates to a shovel that includes both an expanded and collapsed state. The shovel includes a blade member and an elongated shaft member. The elongated shaft member is slidably engaged to the blade member through a recess that extends through the blade member. The elongated shaft member is able to translate with respect to the blade member between the extended and collapsed states. The collapsed state relates to a configuration in which the elongated shaft member is extended through the recess and over the blade member a particular amount. The extended state relates to a configuration in which the elongated shaft member is extended through the recess and away from the blade member a particular amount. An optional locking mechanism may be utilized to releasably lock the elongated shaft member with respect to the blade member in the two states. Also, while embodiments of the present invention are directed at shovels, it will be appreciated that the teachings of the present invention could be applied to other areas.

Figure 1:
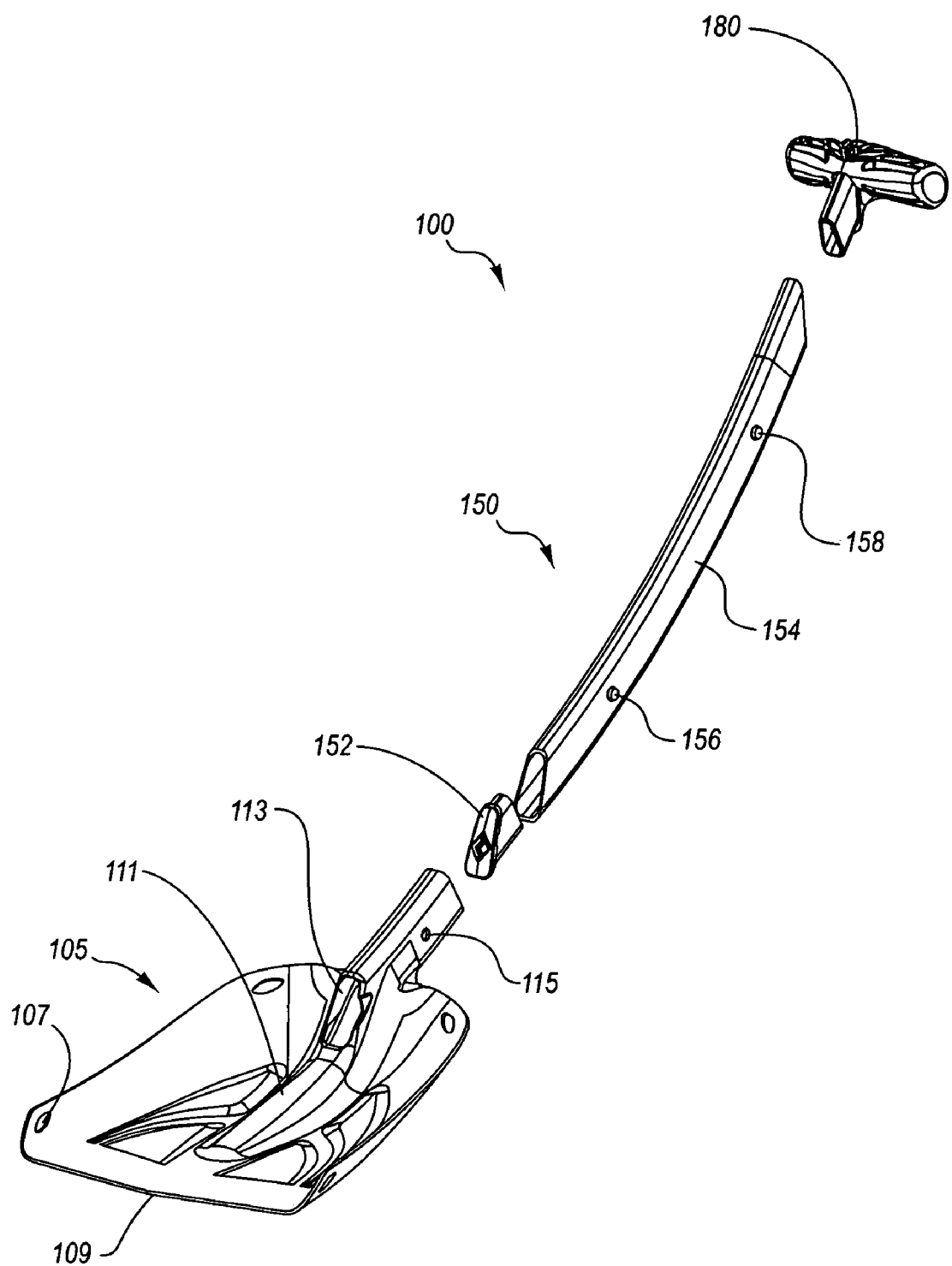
FIG. 1 illustrates an exploded view of a shovel in accordance with one embodiment of the present invention.

Reference is initially made to FIG. 1, which illustrates an exploded view of one embodiment of a shovel in accordance with the present invention, designated generally at 100. The shovel 100 includes a blade member 105 and an elongated shaft member 150. The blade member 105 is the region of the shovel that is designed to scoop up snow and retain snow for displacement. The blade member 105 is generally concave to increase retention of snow. In addition, the illustrated blade member 105 is composed of a single piece of metal allowing for inexpensive manufacturing. The blade member 105 further includes a recess 113, a locking recess 115, a medial region 111, a front 109, and a plurality of attachment holes 107. The recess 113 defines a hollow region that extends at a particular consistent angle/curvature away from the remainder of the blade member 105. Industry experts may alternatively describe the recess 113 as a hozzle. The recess 113 is specifically shaped to accommodate the cross-sectional shape of the elongated shaft member 150.

The locking recess 115 is disposed along the recess 113 and is configured to interface with a selective pin locking mechanism disposed on the elongated shaft member 150. When assembled, a pin is allowed to extend out of the locking recess 115 to releasably engage the elongated shaft member 150 at a particular distance with respect to the blade member 105.

The medial region 111 defines the interior region of the blade member 105. The medial region 111 is surrounded by beveled edges and curved surfaces to retain snow that has been scooped up. The front 109 of the blade member 105 is a narrow non-curved surface that is designed to allow snow to easily slide up into the medial region 111. The attachment holes 107 are positioned to allow for various attachment systems to be coupled to the shovel 100. For example, it is common to extend two straps between two independent attachment holes to allow the shovel 100 to be retained on a user's back during activities.

The elongated shaft member 150 is slidably coupled to the blade member 105 to allow for extension and collapsing. The elongated shat member 150 is cross-sectionally shaped to match the recess 113 on the blade member 105. The elongated shaft member 105 is cross-sectionally shaped in a non-round shape so as to prevent rotation with the blade member 105. The elongated shaft member 150 also includes a lengthwise curvature that assists in generating scooping and lever forces when scooping up snow. The elongated shaft member 150 further includes a handle 180, a collapsed locking pin 158, an extended locking pin 156, a shaft 154, and a cap 152.

The handle 180 is disposed on the distal end of the elongated shaft member 150 relative to the blade member 105. The handle 180 provides a coupling point for a user's hand. The illustrated handle 180 is uniquely configured to receive both a gloved hand and a mittened hand. The handle 180 can be used to assist in generating lever type forces when scooping up snow. The handle 180 is coupled to the shaft 154. The shaft 154 forms the body of the elongated shaft member 105. The illustrated shaft 154 is a single piece metal member which includes the lengthwise curvature of the elongated shaft member 105. A cap 152 is coupled to the proximal end of the shaft 154 relative to the blade member 105. The cap 152 prevents snow or other debris from sliding up into the shaft 154 during use.

An extended locking pin 156 and a collapsed locking pin 158 are coupled to the shaft at particular distances from the cap 152 and handle 180. The locking pins 156, 158 are spring biased protrusions which are biased into an extended position away from the shaft 154. However, the locking pins 156, 158 can be pushed back into the shaft 154 so as to be substantially flush with the outer surface of the shaft 154. It is necessary for the locking pins 156, 158 to be flush with the shaft 154 when sliding the corresponding portion of the elongated shaft 150 through the recess. The locking pins 156, 158 are configured to extend out through the locking recess 115 of the blade member 105 when locking into either the collapsed or extended states.

Figure 2:
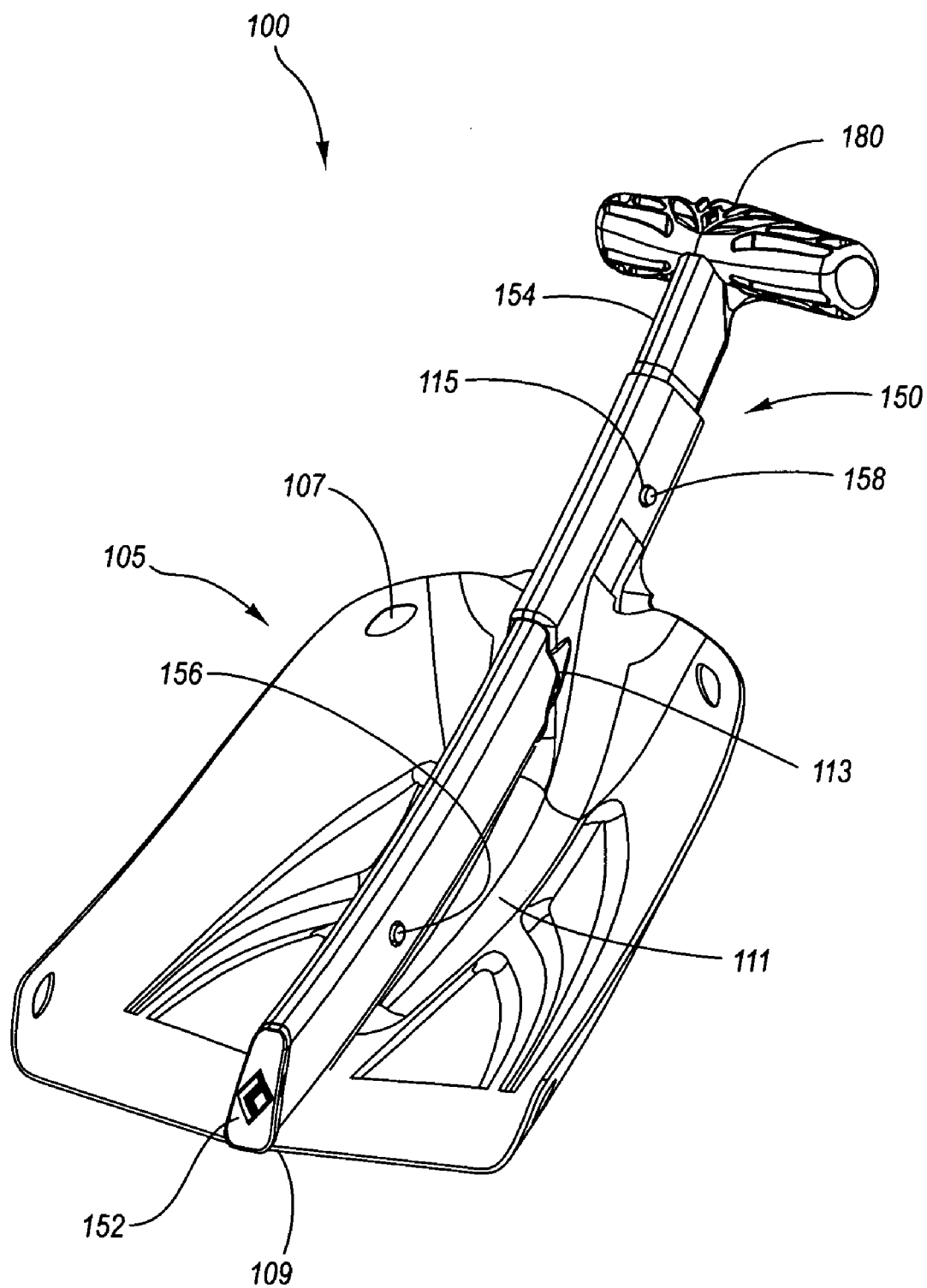
FIG. 2 illustrates a perspective view of the shovel of FIG. 1 in a collapsed state.

Reference is next made to FIG. 2, which illustrates a perspective view of the shovel of FIG. 1 in a collapsed configuration. In the collapsed configuration, the elongated shaft member 150 is extended through the recess 113 so as to overlap the medial region 111 of the blade member as illustrated. This overlapping or nesting of the elongated shaft member 150 minimizes the overall dimensions of the shovel 100. The collapsed locking pin 158 is extended through the locking recess 115 releasably locking the elongated shaft member 150 with respect to the blade member 105. It is preferable for the shaft 154 to extend all the way to the front 109 of the blade member 105 so as to maximize overlapping.

In operation, the shovel is transitioned to the collapsed state from the extended state through a series of interconnected operations. A user must disengage or depress the extended locking pin 156 so as to allow the shaft 154 to slide with respect to the recess 113. The elongated shaft member 150 must then be pushed towards the blade member 105 causing the shaft 154 to slide through the recess 113. The collapsed locking pin 158 must be disengaged or depressed to allow the shaft 154 to properly overlap the medial region 111 of the blade member 105. When the shaft 154 properly overlaps the medial region 111, the collapsed locking pin 158 will automatically extend out from the locking recess 115 and releasably engage the collapsed configuration of the shovel 100.

Figure 3:
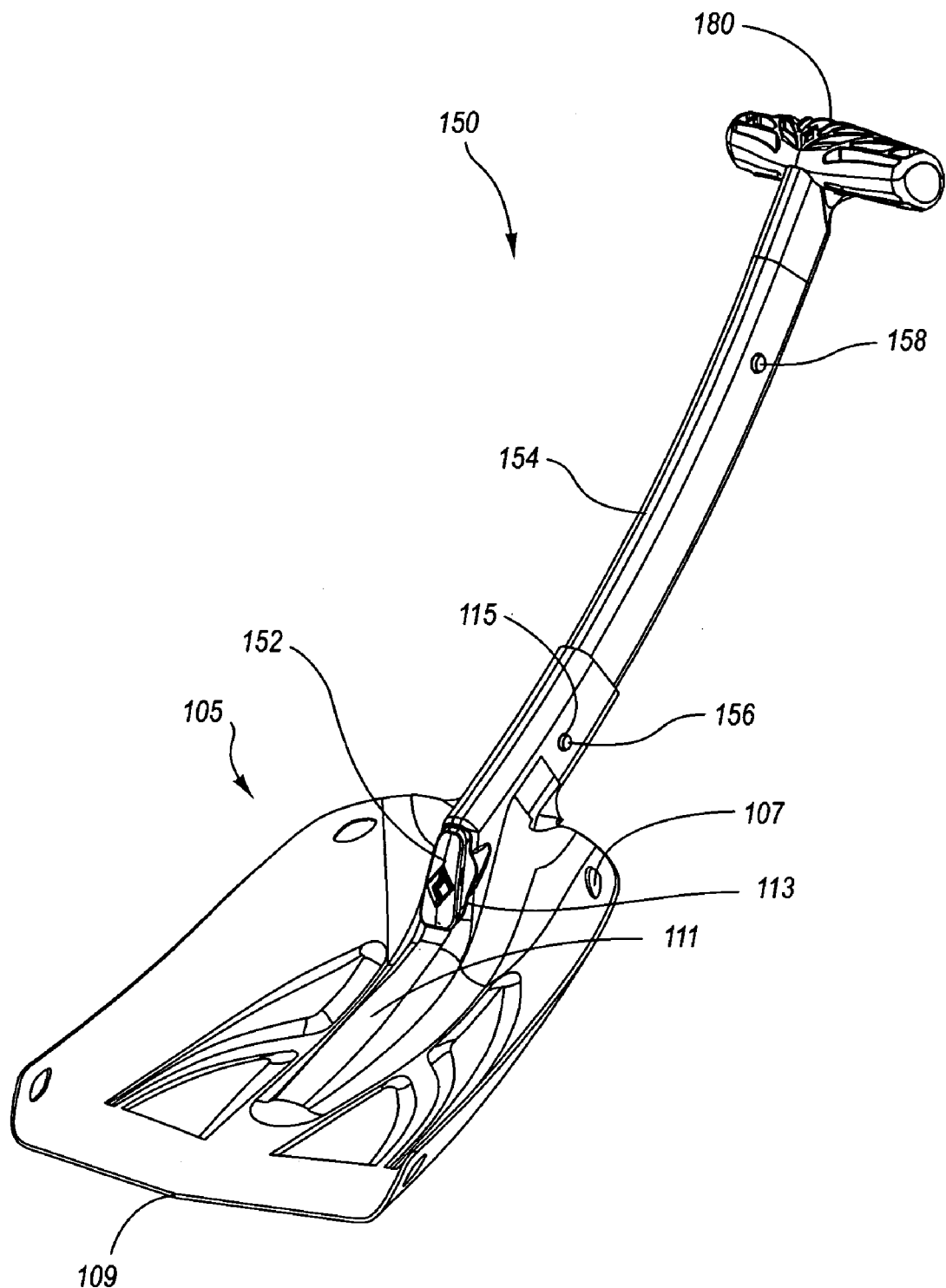
FIG. 3 illustrates a perspective view of the shovel of FIG. 1 in an extended state.

Reference is next made to FIG. 3, which illustrates a perspective view of the shovel of FIG. 1 in an extended configuration. In the extended configuration, the elongated shaft member 150 is extended through the recess 113 a minimal amount such that the cap 152 is approximately, flush with the recess 113 opening, as illustrated. This positioning of the shaft 154 maximizes the length of the elongated shaft member 150 which extends away from the blade member 105. It is necessary for a portion of the shaft 154 to remain in the recess 113 to maintain functionality of the shovel 100. The extended locking pin 156 is extended through the locking recess 115 releasably locking the elongated shaft member 150 with respect to the blade member 105.

In operation, the shovel is transitioned to the extended state from the collapsed state through a series of interconnected operations. A user must disengage or depress the collapsed locking pin 158 so as to allow the shaft 154 to slide with respect to the recess 113. The elongated shaft member 150 must then be pulled away from the blade member 105 causing the shaft 154 to slide through the recess 113. A small hooded region or flanged member on the blade member 105 will automatically depress the extended locking pin 158 as the elongated shaft member 150 is extended away from the blade member 105. Alternatively, the extended locking pin 158 may be depressed to allow the elongated shaft member 150 to extend further away from the blade member 105. Once the shaft 154 is properly extended from the blade member 105, the extended locking pin 156 will automatically extend out from the locking recess 115 and releasably engage the extended configuration of the shovel 100. It should be noted that the transition to the extended configuration can be accomplished in essentially one motion. A user's first hand depresses the collapsed locking pin 158 while the second hand pulls the elongated shaft member 150 away from the blade member 105 effectively engaging the extended state. This unique quick deployment process is particularly advantageous in saving time.

It should be noted that the blade member 105 and the elongated shaft member 150 may be composed of materials other than metal including but not limited to plastic composites. Likewise, the specific shape and curvature of the blade member 105 and the elongated shaft member 150 may be altered and still accomplish many of the same functions. Various handles and locking mechanisms may also be used and remain consistent with the present invention.

What is claimed is:

1. A collapsible shovel comprising:
   a blade member which includes a front end, a rear end, and two sides, wherein the rear end includes a recess which extends through the blade member, wherein the blade member and recess include a blade curvature between the front end and the rear end defining a partially enclosed scoop;

an elongated shaft member which includes a first end and a second end, wherein the first end is coupled to a handle, and wherein the second end is slidably engaged to the blade member by extending through the recess so as to facilitate two independent operational states including an extended state and a collapsed state, wherein the elongated shaft member is coupled to the blade member in both the extended and collapsed states, wherein the elongated shaft member further includes at least two locking mechanisms, wherein the at least two locking mechanisms releasably couple the elongated shaft member to the blade member at a position corresponding to the extended and collapsed states respectively, and wherein the elongated shaft member includes a shaft curvature between the first end and second end wherein the elongated shaft member extends through the recess at substantially the same angle with respect to the blade member in both the extended and collapsed state, and wherein the blade curvature corresponds to the shaft curvature such that the elongated shaft member is substantially disposed within the partially enclosed scoop of the blade member in the collapsed state;

wherein the collapsed state includes the second end of the elongated shaft member disposed substantially over the front end of the blade member within the partially enclosed scoop; and wherein the recess includes a cross-sectionally shaped cavity with substantially the same shape as the cross-sectional shape of the elongated shaft member.

2. The collapsible shovel of claim 1, wherein the extended state includes the second end of the elongated shaft member disposed substantially within the recess of the front end of the blade member external to the partially enclosed scoop.

3. The collapsible shovel of claim 1, wherein the shaft curvature extends substantially the entire length between the first and second ends.

4. The collapsible shovel of claim 1, wherein the elongated shaft can be switched from the collapsed state to the extended state with a single directional translation.

5. The collapsible shovel of claim 1, wherein the handle includes a shape so as to be engageable with a mitten.

6. The collapsible shovel of claim 1, wherein the front end of the blade is substantially flat, and wherein the sides and rear end of the blade are flanged to create the partially enclosed scoop, wherein the partially enclosed scoop is a three dimensional region defined substantially by the length, width, and height of the blade member.

7. A collapsible shovel comprising:

a blade member which includes a front end, a rear end, and two sides, and a central region, wherein the rear end includes a recess which extends through the blade member, and wherein the recess includes an internal recess curvature, and wherein the blade member includes a blade curvature between the first end and the rear end defining a partially enclosed scoop;

an elongated shaft member which includes a first end and a second end, wherein the first end is coupled to a handle, and wherein the second end is slidably engaged to the blade member by extending through the recess so as to facilitate two independent operational states including an extended state and a collapsed state, wherein the elongated shaft is coupled to the blade member in both the extended and collapsed states;

wherein, the elongated shaft member includes a particular shaft curvature between the first and second ends, and wherein the internal recess curvature, blade curvature, and shaft curvature are correspondingly shaped such that in the collapsed state, the curvature of the portion of the elongated shaft member extending through the recess is substantially lengthwise aligned with the blade member; and wherein the collapsed state includes the second end of the elongated shaft member disposed substantially adjacent to the front end of the blade member substantially within the partially enclosed scoop.

8. The collapsible shovel of claim 7, wherein the elongated shaft member extends through the recess at substantially the same angle with respect to the blade member in both the extended and collapsed state.

9. The collapsible shovel of claim 7, wherein the elongated shaft member includes at least two locking mechanism, wherein the at least two locking mechanisms releasably couple the elongated shaft member to the blade at a position corresponding to the extended and collapsed states respectively.

10. The collapsible shovel of claim 7, wherein the lengthwise alignment of the elongated shaft member in the collapsed state includes the portion of the elongated shaft member extending through the recess being disposed a substantially consistent distance from the blade member.

11. The collapsible shovel of claim 7, wherein the shaft member includes a latching mechanism, and wherein the recess includes an extension system, and wherein the extension system facilitates a single motion transition from the collapsed state to the extended state.

12. The collapsible shovel of claim 7, wherein the elongated shaft can be switched from the collapsed state to the extended state with a single directional translation.

13. The collapsible shovel of claim 7, wherein the handle includes a shape so as to be engageable with a mitten.

14. The collapsible shovel of claim 7, wherein the front end of the blade is substantially flat, and wherein the sides and rear end of the blade are flanged to create a concave internal blade region.

* * * * *